United States Patent [19]
Beaston

[11] 3,777,741
[45] Dec. 11, 1973

[54] DEVICE FOR LOCATING SORE SPOTS ON HORSE HOOVES

[76] Inventor: Bud A. Beaston, Rt. 1, Box 13, Sperry, Okla. 74073

[22] Filed: Apr. 25, 1972

[21] Appl. No.: 247,378

[52] U.S. Cl. .................................. 128/2 R, 81/414
[51] Int. Cl. .............................................. A61b 5/00
[58] Field of Search ................. 81/5.1 R, 407, 414, 81/426, 442, 425, 3 A; 128/2 R, 346

[56] References Cited
UNITED STATES PATENTS

| 3,192,805 | 7/1965 | Manning | 81/414 |
| 816,278 | 3/1906 | Tracht | 81/426 |
| 1,151,789 | 8/1915 | Huck | 81/426 |
| 2,583,896 | 1/1952 | Siebrandt | 81/425 |
| 815,446 | 3/1906 | Lott | 81/426 |
| 1,337,986 | 4/1920 | Allan | 81/407 |
| 288,244 | 11/1883 | Koenig | 7/3 A |
| 371,476 | 10/1887 | Reese | 81/426 |

Primary Examiner—Aldrich F. Medbery
Attorney—William S. Dorman

[57] ABSTRACT

An adjustable pincer-like tool for engaging horse hooves for locating sore spots thereon. The tool comprises a first pincer member provided with a handle portion and a gripping portion interconnected by an angularly disposed elongated slotted portion, and a second pincer member having a handle portion and a gripping portion interconnected by a relatively short angled portion, with the relatively short angled portion being pivotally secured to the elongated slotted portion in a manner permitting adjustment of the relative positions of the pincer members for providing an adjustable cooperating gripping position for the gripping portions of the pincers. In one extreme adjustment position between the pincers, the gripping portions may be moved into close proximity with each other upon closing of the handle portions, whereas in the opposite extreme adjustment position between the pincers, the gripping portions are spaced apart in the closed position of the handle portions.

4 Claims, 2 Drawing Figures 3,777,741

DEVICE FOR LOCATING SORE SPOTS ON HORSE HOOVES

BACKGROUND OF THE INVENTION

1. Field of the Invention:

This invention relates to improvements in devices for locating sore spots on horse hooves, and more particularly, but not by way of limitation, to an adjustable pincer-like tool for selectively engaging the hooves to locate sore spots thereon.

2. Description of the Prior Art:

In order to locate sore spots on a horse hoof it is necessary to apply pressure to the hoof from various positions, such as around the outer portions of the hoof, and against the flat portions of the hoof. At the present time, the usual tool for applying the necessary pressure to the horse hoof comprises rather large and cumbersome tongs which must be manipulated while another person holds the horse's hoof. It will be readily apparent that this is frequently a disadvantage in that many times it may be desirable to check a horse hoof when two persons are not available.

SUMMARY OF THE INVENTION

The present invention contemplates a compact adjustable pincerlike tool wherein the tool and the hoof may be easily handled by a single operator for applying pressure to the hoof as required for determining the location of sore spots thereon. The novel tool comprises a first pincer element having a handle portion of a size for ease of manual grasping by the hand, and an arcuate gripping element particularly designed for facilitating engagement thereof with a horse hoof. The gripping element is connected with the handle portion by an elongated angular disposed slotted member which provides an offset position of the gripping element with respect to the handle portion. A second pincer element is pivotally secured to the first pincer element and comprises a handle portion complementary to the first handle portion and readily engagable by the hand simultaneously with the first handle portion for providing alternate open and closed positions for the tool. An arcuate gripping element is also provided for the second pincer element for cooperating with the first gripper element to properly engage the hoof during use of the tool. The handle portion and gripping element of the second pincer element are interconnected by a relatively short angled portion whereby the second gripping element is slightly offset with respect to the second handle portion. A pivot pin connects the small angled portion of the second pincer element with the slot of the first pincer element, and adjustment detent means is provided on the first and second pincer elements to provide an adjustable operation for the tool. In one extreme adjustment position between the pincer element, the gripping elements may be moved into close proximity with each other when the handle members are moved together, whereas in the opposite extreme adjustment position between the pincer elements, the gripping elements are spaced apart when the handle members are moved together, with a variety of relative positions for the gripping elements being provided between the two extreme adjustment positions of the pincer members. In certain adjustment positions, the tool is particularly adapted for simultaneously opposite side portions of the horse's hoof and applying pressure thereagainst for facilitating the locating of any sore spots.

DESCRIPTION OF THE PREFERRED EMBODIMENT

Figures 1, 2:
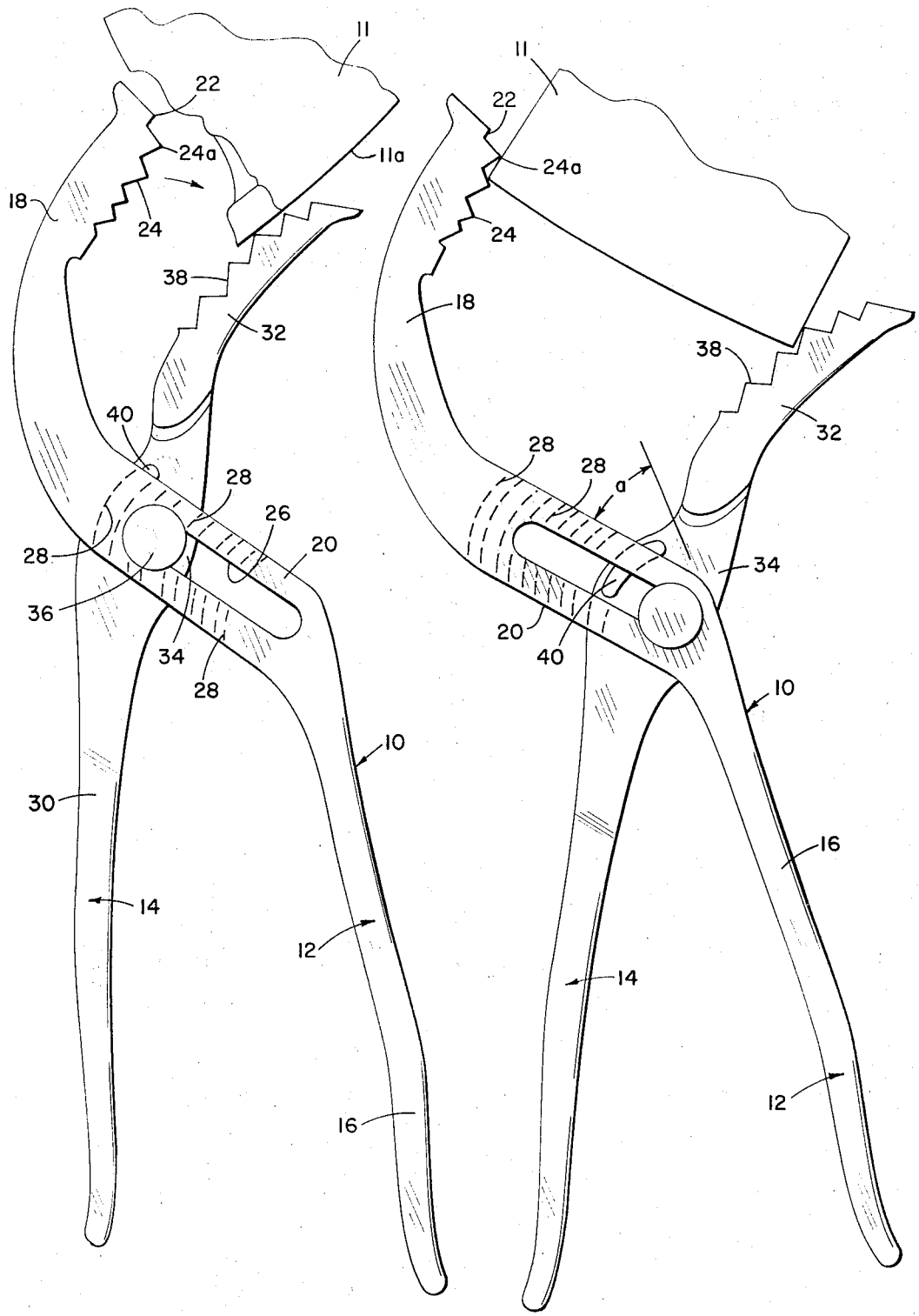
FIG. 1 is a view of a tool embodying the invention and depicts the tool as applied in one manner to a horse's hoof.
FIG. 2 is a view similar to FIG. 1 depicting the tool as applied in another manner to a horse hoof.

Referring to the drawings in detail, reference character 10 generally indicates a tool for facilitating the locating of sore spots on a horse hoof 11. The tool 10 comprises a first pincer member 12 pivotally secured to a second pincer member 14 in a manner as will be hereinafter set forth. The pincer member 12 comprises a handle portion 16 of a well known configuration similar to pliers, or the like, for facilitating manipulation thereof by the hand of an operator, and a gripping portion 18 connected to the handle 16 by an angularly disposed elongated portion 20 whereby the gripping portion 18 is offset with respect to the handle portion 16. As depicted herein, the intermediate portion 20 is at an angle of substantially 45° with respect to the handle portion 16 as shown at a in FIG. 2, which as a practical matter provides an efficient relationship between the working elements of the tool 10 for the purpose as will be hereinafter set forth.

The gripping portion 18 is of an arcuate configuration, bending in a direction toward an imaginary extension of the handle 16, with the inner corner 22 of the outer extremity of the gripping element 18 terminating in substantial alignment with the centerline of the handle 16. The inwardly directed edge of the gripping element 18 is provided with teeth or serrations 24, with the outermost serration 24a preferably being in substantial alignment with the corner 22 and the centerline of the handle 16 for facilitating engaging of the hoof 11 as will be hereinafter set forth.

An elongated slot 26 is provided in the angled portion 20 for facilitating pivotally securing the pincer 14 to the pincer 12, as will be hereinafter set forth. The inwardly directed surface of the elongated portion 20 is provided with a plurality of spaced arcuate recesses 28 as shown in dotted lines in the drawings for a purpose as will be hereinafter set forth.

The pincer 14 comprises a handle portion 30 generally similar to the handle 16 but oppositely disposed with respect thereto. A gripping element 32 is connected with the handle 30 by a relatively short slightly angularly disposed portion 32. An aperture (not shown) is provided in the angled portion 34 for receiving a bolt 36, or the like, which extends therethrough and through the slot 26 for pivotally securing the pincers 12 and 14 to each other. A suitable lock nut (not shown) is preferably provided for securing the bolt 36 in position. The gripping element 32 is of an arcuate configuration and curves generally parallel with the curve of the gripping element 18 as clearly shown in the drawings. The inwardly directed edge of the gripping element 32 is provided with a plurality of teeth or serrations 38 for cooperating with the teeth 32 for applying pressure to the hoof 11 during operation of the tool 10.

The elongated portion 20 of the pincer 12 and the slightly angled portion 34 of the pincer 14 are of a smaller cross-sectional dimension than the remaining portions of the respective pincers whereby the pincers are pivotally secured together with the handles 16 and 30 and the gripping elements 18 and 32 are substantially coplanar with respect to each other, as is well known in tools of this general pincer type. The inwardly directed surface of the portion 34 of the pincer 14 is provided with an outwardly extending arcuate flange member 40 of a configuration complementary to the configuration of the arcuate recesses 28 and is selectively engagable with the recesses to provide an adjustment of the distance between the gripping elements 18 and 32. For example, when the flange 40 is engaged in the left hand groove or recess 28 as viewed in FIG. 1, the gripping elements 18 and 32 will be in the closest proximity to each other, whereas, when the flange 40 is engaged with the right hand groove or recess 28 as shown in FIG. 2, the gripping elements 18 and 32 will be at the greatest distance apart. Of course, engagement between the flange 40 and any of the intermediate grooves 28 will vary the distance between the gripping elements 18 and 32 as desired.

In order to locate sore spots on the hoof 11, it is usually necessary to apply pressure against the lower surface 11a of the hoof as indicated in FIG. 1, as well as against opposite sides of the hoof 11, as indicated in FIG. 2. When pressure is to be applied to the lower surface 11a, the pincers 12 and 14 may be adjusted by positioning the flange 40 in a preselected groove 28 for providing the desired distance between the gripping elements 18 and 32 whereby the gripping element 32 may be disposed adjacent the surface 11a, and the gripping element 18 may be disposed adjacent the side of the hoof 11. Manual pressure may then be applied to the handles 16 and 30 for urging the gripping elements against the hoof. It is to be noted that the particular arrangement of the tooth 24a and the corner 22 (which also functions as a serration or tooth for the gripping element 18) permits the disposition of both of these teeth against the outer periphery of the hoof during the application of pressure against the bottom 11a thereof. Also the teeth 24 and 24a, as seen in FIG. 1, have a higher elevation than the remaining interior teeth to apply a selective probing force on the hoof. Of course, the position between the gripping elements 18 and 32 may be adjusted as desired in order that pressure may be selectively applied against substantially any portion of the surface 11a by the gripping element 32. This may be readily accomplished by a single operator who can hold the hoof himself in the usual manner and operate the tool 10 with one hand.

When the pressure is to be applied to opposite sides of the hoof 11, the pincers 12 and 14 may be adjusted for providing a greater distance between the gripping elements 18 and 32, and the teeth 23 and 38 may be disposed adjacent the desired opposite sides of the hoof, and manual pressure may be applied to the handles 16 and 30 for applying pressure against the hoof as desired for determining the location of any sore spots on the hoof. It will be apparent that this operation may also be accomplished by a single operator of the tool 10.

From the foregoing it will be apparent that the present invention provides a novel pincer-like tool for facilitating the location of sore spots on horses' hooves and which may be operated by a single person. The novel tool comprises a pair of cooperating pincer elements pivotally secured together in a manner providing for adjustment of the relative position of the gripping elements to facilitate placing of the gripping elements adjacent portions of the hoof to be pressurized in order to determine the location of any sore spots thereon. The novel tool is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. An improvement in a pincer-like tool for locating sore spots on a horse's hoof by one person acting alone; said pincer-like tool having a first pincer member, a second pincer member, a handle on each pincer member, a gripping jaw having an arcuate configuration on each pincer member, and an adjustable pivot pivotally securing the first pincer member to the second pincer member for selectively adjusting the distance between the jaws of said pincer members; comprising serrations on the arcuate jaw of the first pincer member, said serations adjacent the end being longer than the remaining serations and defining a means for selectively applying a probing force to the hoof, and serrations on the arcuate jaw of the second pincer member complimentary to the serrations on the arcuate jaw of the first pincer member, whereby the complementary serrations of the arcuate jaw of the first pincer member and the arcuate jaw of the second pincer member can be selectively disposed adjacent opposite sides of the hoof for engaging the hoof and applying localized pressure to the sides of the hoof.

2. The improvement as set out in claim 1 wherein the serrations on each gripping jaw each have a triangular shape with respect to the surface of the gripping jaw, the inner upper face of each triangularly shaped serration in contact with the hoof being substantially parallel to and in uniform contact with the side of the hoof when the tool is employed to apply localized pressure to the side of the hoof.

3. The improvement as set out in claim 1 wherein the gripping jaw of the first pincer member is outwardly arcuate and the outermost end of said gripping jaw is in substantial alignment with the handle of said pincer member to facilitate arresting the downward movement of the first pincer member when the tool is employed to apply localized pressure to the bottom of the hoof.

4. The improvement as set out in claim 3 wherein the outermost end of the gripping jaw of the first pincer member has serrations which laterally engage the side of the hoof to arrest downward movement of the first pincer member when the tool is engaged with the hoof to apply localized pressure to the bottom of the hoof.

* * * * *